United States Patent
Watanabe et al.

(10) Patent No.: US 9,065,962 B2
(45) Date of Patent: Jun. 23, 2015

(54) BOOK READOUT SYSTEM AND BOOK READOUT METHOD

(75) Inventors: Yoshihiro Watanabe, Tokyo (JP); Masatoshi Ishikawa, Tokyo (JP); Hiroki Shibayama, Tokyo (JP)

(73) Assignee: University of Tokyo, Tokyo (JP)

( * ) Notice: Subject to any disclaimer, the term of this patent is extended or adjusted under 35 U.S.C. 154(b) by 0 days.

(21) Appl. No.: 13/818,099

(22) PCT Filed: Aug. 19, 2011

(86) PCT No.: PCT/JP2011/068734
§ 371 (c)(1), (2), (4) Date: Mar. 7, 2013

(87) PCT Pub. No.: WO2012/023596
PCT Pub. Date: Feb. 23, 2012

(65) Prior Publication Data
US 2014/0009797 A1    Jan. 9, 2014

Related U.S. Application Data

(60) Provisional application No. 61/375,511, filed on Aug. 20, 2010, provisional application No. 61/509,038, filed on Jul. 18, 2011.

(51) Int. Cl.
H04N 1/00 (2006.01)
G06K 9/36 (2006.01)
H04N 1/04 (2006.01)
G06T 1/00 (2006.01)
G06T 7/00 (2006.01)
G06T 3/00 (2006.01)

(52) U.S. Cl.
CPC ............... H04N 1/04 (2013.01); G06T 1/0007 (2013.01); G06T 7/0057 (2013.01); G06T 2207/10004 (2013.01); G06T 2207/10028 (2013.01); G06T 2207/30176 (2013.01); G06T 3/0031 (2013.01)

(58) Field of Classification Search
CPC .................................... H04N 1/04; G06T 1/00
See application file for complete search history.

(56) References Cited

U.S. PATENT DOCUMENTS

| 7,508,978 B1* | 3/2009 | Lefevere et al. ............. 382/154 |
| 2002/0113946 A1 | 8/2002 | Kitaguchi |
| 2009/0226035 A1 | 9/2009 | Iihoshi |

FOREIGN PATENT DOCUMENTS

| JP | 2001-201457 A | 7/2001 |
| JP | 2003-78725 A | 3/2003 |
| WO | 2007/091604 A1 | 8/2007 |

OTHER PUBLICATIONS

International Search Report dated Nov. 8, 2011, in International Application No. PCT/JP2011/068734, filed Aug. 19, 2011, 4 pages.
Nakashima, T., et al., "Book Flipping Scanning," 22nd Symposium on User Interface Software and Technology (UIST2009), Victoria, British Columbia, Oct. 4-7, 2009, pp. 79-80.

* cited by examiner

Primary Examiner — Benny Q Tieu
Assistant Examiner — Sunil Chacko
(74) Attorney, Agent, or Firm — Christensen O'Connor Johnson Kindness PLLC

(57) ABSTRACT

A book readout system and method for reading out information described in a book at a high speed, while the book, in a bound form, is flipped through. A page state measuring unit (2) measures a page state of a book being flipped through. A book image acquisition unit (1) comprises a plurality of first cameras (11) which respectively acquire book images with respect to a page of the book, from mutually different directions, for a plurality of number of times. A data processing unit (3) corrects the book image acquired by the book image acquisition unit (1) using the information of the page state of the book measured by the page state measuring unit (2).

5 Claims, 12 Drawing Sheets

FIG.9 restore developed corrected image developable image for time period T → book image for $N_2$ observed point for time period T ($T \times N_2$ images taken of the same page) → solve following equation, restore developed corrected image $$\min_{J} \sum_{k=1}^{T} \sum_{j=1}^{N_2} \sum_{q} \| I_k^j(q) - \tilde{I}_k^j(q; \Theta_k, J) \|^2 + f(J).$$

BOOK READOUT SYSTEM AND BOOK READOUT METHOD

TECHNICAL FIELD

The present invention relates to a book readout system and a book readout method. The present invention relates particularly to preferred technology for automatically reading out information stored in a bound book while the books is being flipped through.

BACKGROUND ART

Techniques for restoring a shape from a plurality of images continue to create applications having a lot of appeal, from modeling of a model to restoration of a building. However, a lot of these techniques have solved many problems by assuming that a target object is a rigid body. In the case where an object is non-rigid, there has been a demand to solve problems using new methods, due to significant differences in assumption where shape is deformed. As shape restoration in the case where an object is non-rigid, in recent years a few method have been proposed, but a standardized method, as in the case of a rigid body, has not been established. This has therefore become a challenging topic in the field of computer vision.

It is conceivable that the technical challenges posed by the estimation of deformation of a non-rigid body, together with its application, will be able to make innovative contributions over a wide range of fields, from industrial inspection to entertainment. Up to now, in reports relating to similar methods there has been no suggestion of conclusive application developments, but highly beneficial approaches have been proposed. For example, evaluation experiments have been carried out to estimate deformation of paper, cans, T-shirts, yacht sails etc. In particular, a non-elastic material was used as a restraint condition, and focus placed on restoration of only deformation.

Here, non-elasticity of an object introduced with a conventional deformation model is considered to mean the fact that it is possible to develop to a flat state as long as the object has been deformed from an originally flat surface. An operation to carry out this development may possibly carry important significance for the restoration problem. Specifically, it is possible to use a condition where only a singe type of texture image exists that has been developed for all observed images. In this way, it is conceivable that there will be a significant advantage, in terms of enabling restoration of texture of an object surface using images that have been observed, with two aspects of application and technique.

This type of technology can conceivably contribute to the field of book digitalization. In recent years the need for digitalization of books has increased globally. When digitizing books, high speed and high resolution are essential, but a system that satisfies both of these demands has not yet been realized. Up to now, a style of sequentially digitizing pages of a book one at a time while the sheets are fixed in a comparatively flat state is commonplace, and this has a problem in that time is required.

In order to solve this problem, Book Flipping Scanning has been proposed (non-patent publication 1 below), to carry out digitalization by thumbing through pages of a book without stopping.

According to this new method, it is conceivable to create a number of system structures in accordance with various requirements, from industrial applications to individual applications. For example, a system has been proposed of a type that acquires a shape in real time using a 3-dimensional sensor, and corrects a deformed book image that has been acquired by a camera using information about this shape (non-patent publication 1 below). However, this system comprises only a single camera, and takes an image only once for each page, and as a result there was room for improvement from the point of view that resolution of the book image is low, and blind areas arise where the paper sheets are overlapped.

CITATION LIST

Non-Patent Literature

Non-patent publication 1: T. Nakashima, Y. Watanabe, T. Komuro, and M. Ishikawa. Book flipping scanning. 22nd Symposium on User Interface Software and Technology (UIST2009) (Victoria, 2009.10.5)/Adjunct Proceedings, pp. 79-80, 2009.

SUMMARY OF THE INVENTION

Technical Problem

In execution of a system for continuously digitizing books while flipping through pages, the next page may be hidden by the back of a particular page during flipping, and it may not be possible to acquire an appropriate book image due to unforeseen deformation of pages. If this happens, there is a danger that it will not be possible to properly restore the book image. As also, since a high-speed camera has low resolution, there is a problem that the definition of a book image being digitized is low.

Specifically, there is room for improvement in this respect in order to digitize books.

The present invention has been conceived under the above-described circumstances. The present invention has as its object to provide a technology that can be utilized in acquiring accurate book images while flipping through pages.

Solution to Problem

Means for solving the above-described problems can be described as in the following aspects.

(Aspect 1) A book readout system comprising a page state measuring unit, a book image acquisition unit, and a data processing unit, wherein the page state measuring unit measures page states of a book that is being flipped through, the book image acquisition unit is provided with a plurality of first cameras, the plurality of first cameras respectively acquiring book images for pages of the book from mutually different directions, and the data processing unit corrects the book images that have been acquired by the book image acquisition unit using information on page states of the book that have been measured by the page state measuring unit.

(Aspect 2) The book readout system of aspect 1, wherein the page state measuring unit is provided with a pattern light source for projecting a predetermined pattern towards the pages of the book, and the plurality of first cameras further acquire shape images of pages on which the pattern is being projected.

(Aspect 3) The book readout system of aspect 2, wherein the plurality of first cameras acquire the shape images at the time when the pattern is being projected from the pattern light source, and acquire the book images at a time when the pattern is not being projected from the pattern light source.

(Aspect 4) The book readout system of aspect 1, wherein the page state measuring unit is provided with a second camera for shape images, the second camera being provided with a filter that passes light of a wavelength that is projected from the pattern light source, and blocks other environmental light, the pattern light source projects the predetermined pattern towards the pages of the book using light of a predetermined wavelength, and in this way the second camera is capable of acquiring the predetermined pattern that has been projected onto the pages of the book.

(Aspect 5) The book readout system of any one of aspect 1-aspect 4, wherein the first cameras acquire a plurality of book images for each single page of the book, and the data processing unit increases definition of the book images that have had deformation of the page shape corrected by integrating information on the plurality book images.

Advantageous Effects of the invention

According to the present invention, since images (book images) of characters and pictures that have been printed on the pages of a book are acquired by a plurality of first cameras, compared to the case of using only a single camera the book images are corrected more accurately, and it is possible to digitize book information. A further object of the present invention is to carry out high quality book digitalization compared to the case of performing correction where only a single book image is acquired for a single page, by combining book images that have been taken a plurality of times of pages that are being deformed.

BRIEF DESCRIPTION OF THE DRAWINGS

FIG. 9 is an explanatory drawing for explaining a procedure for restoring a corrected image that has been developed.

DESCRIPTION OF EMBODIMENTS

A book readout system of a first embodiment of the present invention will be described in the following with reference to the attached drawings.

Structure of the First Embodiment

Figure 1:
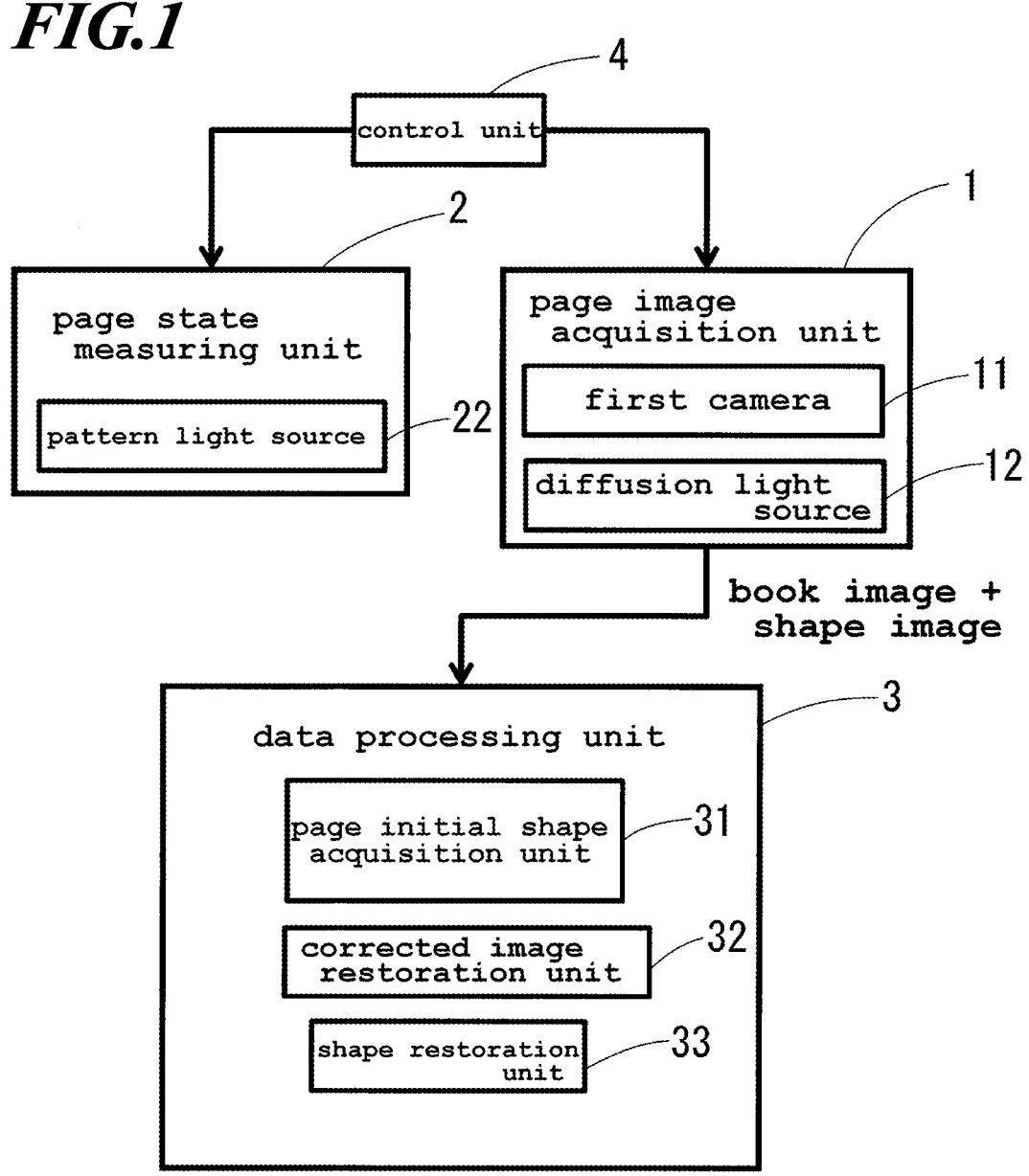
FIG. 1 is a block diagram showing the schematic structure of a book readout system of a first embodiment of the present invention.

A book readout system of this embodiment comprises a book image acquisition unit 1, a page state measuring unit 2, a data processing unit 3 and a control unit 4 (referred to FIG. 1).

The book image acquisition unit 1 is provided with a plurality of first cameras 11 and a diffusion light source 12.

The plurality of first cameras 11 respectively acquire book images for pages of a book from mutually different directions. The first cameras 11 are arranged in an array, to capture book information. The first cameras are also arranged facing the book, so as to be capable of photographing each page of the book.

In the case where there are multiple first cameras 11, they may be arranged so as to be able to divide and photograph the pages of the book. The photographing regions of each camera may also overlap. In the case where there are an odd number of first cameras 11, in addition to the previously described arrangement of an even number of cameras, the remaining single camera may be arranged so as to be able to photograph a whole page.

The first cameras may also be capable of high-speed operation to an extent that it is possible to photograph a plurality of book images every time a single page is flipped.

The diffusion light source 12 is made to operate in synchronization with operation of the first cameras 11 by the control unit 4. Specifically, the diffusion light source 12 is turned on when a first camera 11 acquires a book image, making acquisition of a crisp book image simple. The diffusion light source 12 is for illuminating a book that is to be photographed by the first cameras 11. In the case where environmental light is sufficient, however, it is possible to omit the diffusion light source 12.

The page state measuring unit 2 is configured to measure page states of a book that is being flipped through. In more detail, the page state measuring unit 2 of this embodiment is provided with a pattern light source 22. The pattern light source 22 is for projecting a predetermined pattern towards the pages of the book. With this embodiment, images of pages that have been illuminated with a pattern from the pattern light source 22 (shape images) are acquired by the plurality of first cameras 11. Also, with this embodiment, a projector is used as the pattern light source 22. In more detail, the plurality of first cameras 11 acquire shape images at a time when a pattern is being projected from the pattern light source ($f^{th}$ frame), and acquire page images at a time when a pattern is not being projected from the pattern light source ($f+1^{th}$ frame). A plurality of pattern light sources 22 can be provided. However, in the following description a single pattern light source 22 will be assumed. As will be described later, for the shape images also, a plurality of photographs may be taken for a single page.

Figure 2:
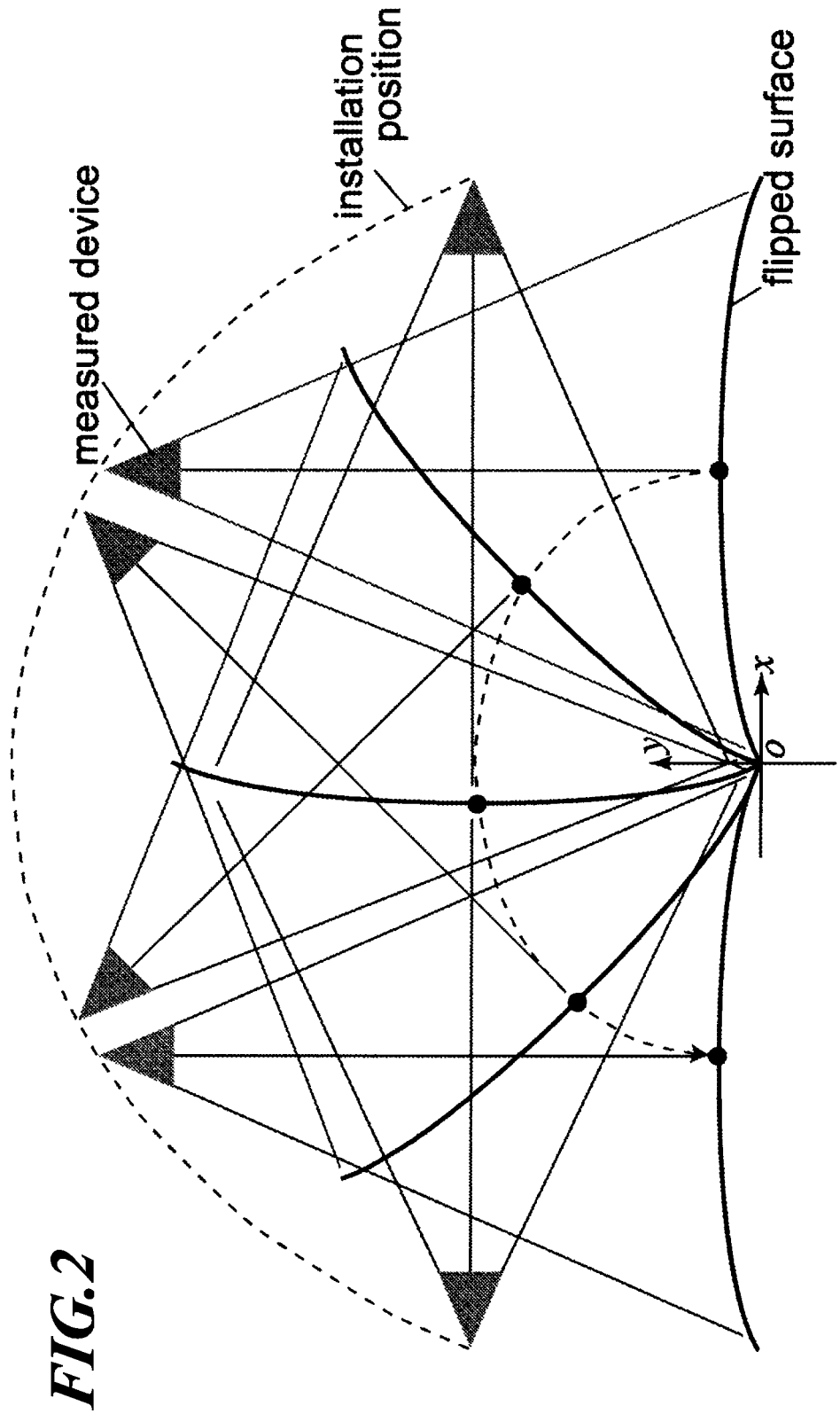
FIG. 2 is an explanatory drawing for describing the arrangement of cameras and a pattern light source of the first embodiment of the present invention.

FIG. 2 shows an arrangement example for the first cameras 11 and the pattern light source 22. FIG. 2 is a diagram looking at the system and movement of a book from the side. The book is flipped through one page at a time. In the drawing, the appearance of the book at a particular moment in time is shown, but the page surfaces are always moving. Here, the center where the book is bound is made an origin O, while a horizontal axis is made the x axis and the vertical axis is made the y axis. A distance to the center of the page is made r, and a semicircle of radius r is traced by flipping movement of that page center. At this time, if a rotational angle of a flipped page is made θ, then the cameras 11 and the pattern light source are preferably provided at positions that give $$(x, y) = (r \cos\theta \mp D \sin\theta, y = r \sin\theta \pm D \cos\theta)$$

Here, D is a distance from the center of a page of the book to an installed camera/pattern light source, and is a parameter determined by angle of view of each device (camera or light source). Cameras and light sources are therefore arranged arbitrarily on a curved traced by the model concerned.

Here, positional relationships between all cameras and light sources, and internal parameters, are previously acquired. This acquisition operation is referred to as calibration. It is therefore made possible with this embodiment to have coordinate transform between all camera images.

The data processing unit 3 is configured to correct book images that have been acquired by the book image acquisition unit 1 using information on page states of the book that have been measured by the page state measuring unit 2. In more detail, the data processing unit 3 of this embodiment is provided with a page initial shape acquisition unit 31, a corrected image restoration unit 32, and a shape restoration unit 33. Specific operation of the data processing unit 3 will be described later. The data processing unit 3 can be constituted, for example, by a computer program executed on computer hardware.

The control unit 4 causes operation of the book image acquisition unit 1 and the page state measuring unit 2 at predetermined times. Operation timing of the book image acquisition unit 1 and the page state measuring unit 2 control unit 4 will be described later. The control unit 4 can also be constituted, for example, by a computer program executed on computer hardware.

Operation of First Embodiment

Next, operation of the book readout system of this embodiment will be described with reference to FIG. 3.

Figure 3:
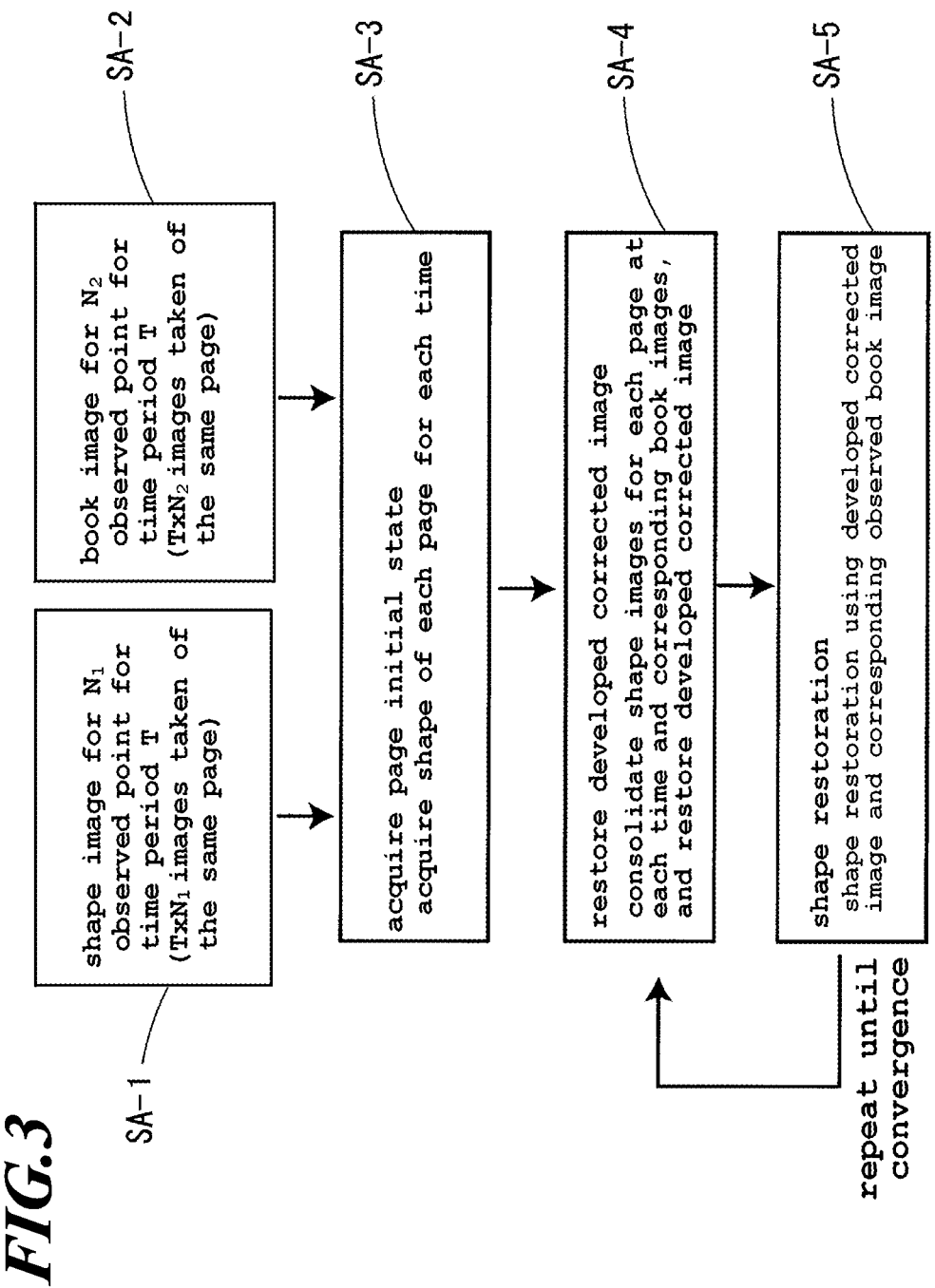
FIG. 3 is a flowchart for describing the overall operation of the book readout system of the first embodiment of the present invention.

(Steps SA-1 and SA-2 of FIG. 3)

First, the page state measuring unit 2 and the book image acquisition unit 1 are driven by the control unit 4, to respectively acquire shape images of the book and book images.

More specifically, for example, the diffusion light sources are fired at time t, and at the same time book images are acquired by the plurality of first cameras 11. Next, the pattern light source is fired at time t+1, and at the same time shape images are acquired by the plurality of first cameras. By repeating this operation it is possible to acquire a plurality of page images and shape images. A photographing cycle for page images and shape images can be appropriately determined in accordance with the speed with which the pages are flipped, and the photographing cycle may be set so that it is possible to acquire a plurality of page images and shape images from the start of flipping to the end of flipping for each page.

The acquired page images and shape images are sequentially sent to the data processing unit 3.

(Step SA-3 in FIG. 3)

Next, a page initial shape is acquired at the time of shooting of each shape image, by the page initial shape acquisition unit 31 of the data processing unit 3. This processing will be described further with reference to FIG. 4.

(Step SB-1 of FIG. 4) (For a Developable Surface)

Figure 5:
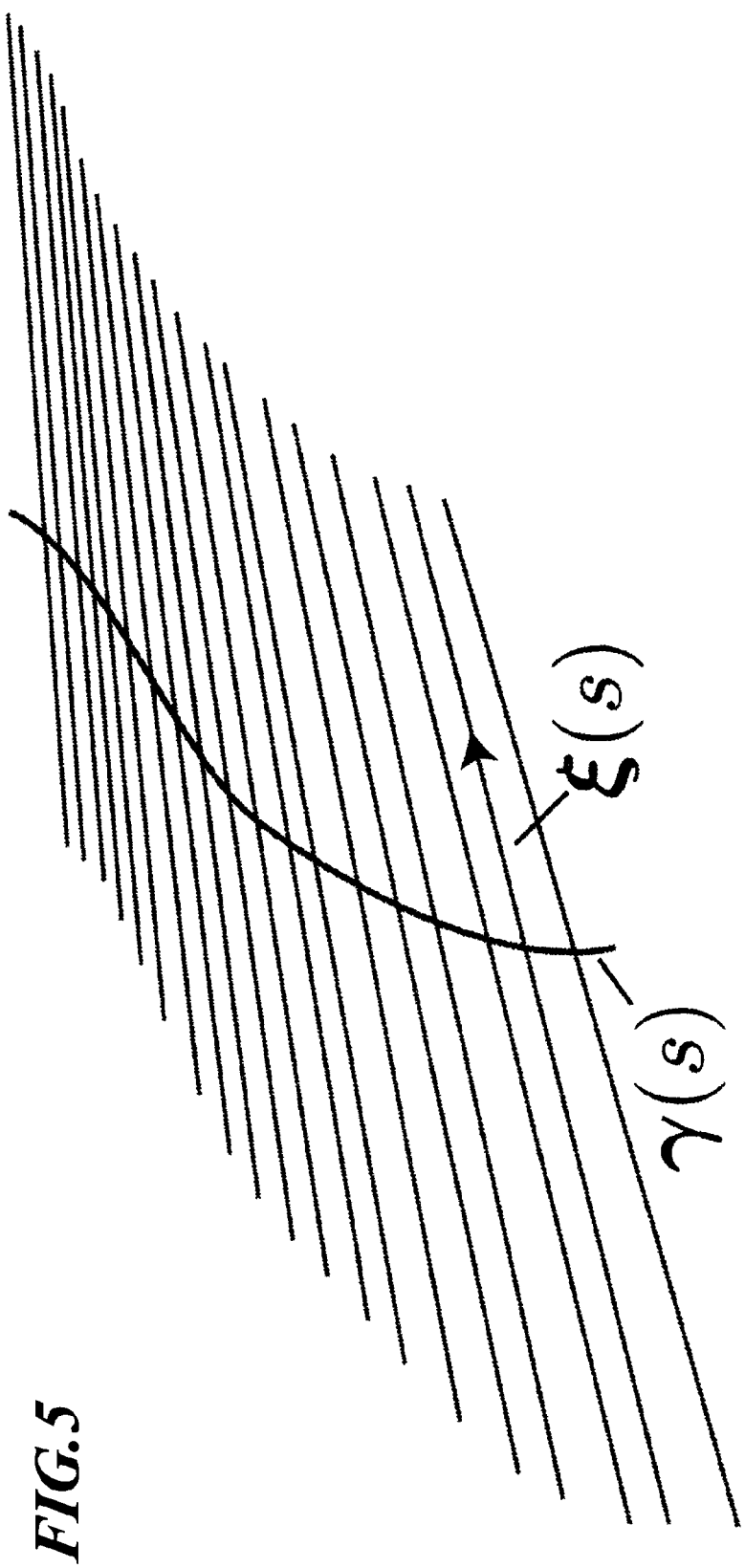
FIG. 5 is an explanatory drawing for describing a developable surface.

Here, the developable surface that will be mentioned in the description of this embodiment will be described. Among curved surfaces depicted as enveloped surfaces when a straight line vector ξ has moved, a developable surface means a curved surface on which Gaussian curvature at an arbitrary point on the curved surface becomes 0. Here, each of straight lines depicting a developable surface will be called a ruling. A curve vector γ linking rulings will be called a directrix (refer to FIG. 5). A general expression for a developable surface can be written as X(s, r)=γ(s)+rξ(s). s is curve length of the curve γ, and r is direction and length of a unit vector ξ. As description example of a developable surface, there are:

$$X(s, r) = \gamma(s) + r \cdot \xi(s)$$
$$\xi(s) = \frac{\gamma''(s) \times \gamma'''(s)}{\|\gamma''(s) \times \gamma'''(s)\|}$$

In this case, by determining a directrix it is possible to set a curved surface constituting a developable surface, and as a result a model parameter for determining a developable surface is defined as a parameter defining a directrix. Other definitions can also be considered, but in this description the same model is mainly assumed.

Figure 6:
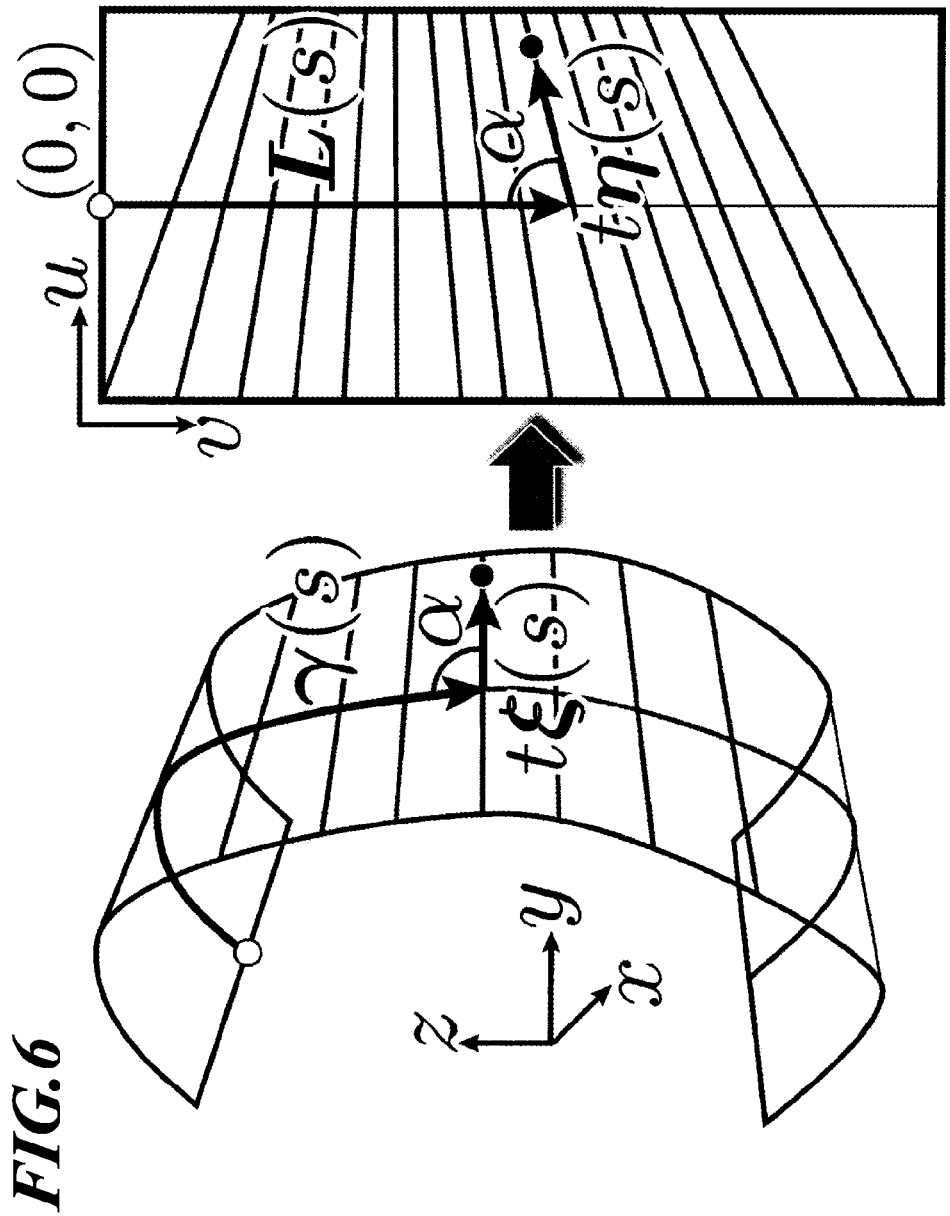
FIG. 6 is an explanatory drawing for describing planar development of a developable surface.

Also, a developable surface can be developed in a plane without expansion, contraction or tearing. With this embodiment, after a developable surface representing page deformation has been estimated, deformation of an observed image is corrected by carrying out this planar development. Subsequently, an image that has had deformation corrected is referred to as a corrected image. The planar expansion here will be described with reference to FIG. 6. With coordinate systems before development and after development, distance is maintained. As a result, coordinates of a developed surface are represented by Q(s,r)=L(s)+rη(s). Also, since the directrix is a geodesic line, it becomes a straight line L on the plane after development. Further, an angle between the directrix γ and a ruling ξ is the same as η corresponding to that between the straight line L and the ruling. Using these relationships, it is possible to obtain coordinates for positioning each point on the developable surface after development.

(Method for Calculating Three-Dimensional Shape Using Shape Images: SB-1)

A method for calculating a 3-D shape of the developable surface from shape images will be described below. This step specifies to which position of a light source pattern that has actually been projected each point of the shape image corresponds, and utilizing this correspondence, three-dimensional positions of each point are calculated using triangulation.

For example, equivalence between points within a shape image and points within a light source pattern is resolved by designing a pattern and positioning cameras and light source patterns so that in the case where a range of page deformation of a book is known in advance, it is possible to uniquely specify a pattern on the shape image. As a simple example, the case of a multiline pattern, in which a pattern is made up of multiple parallel lines segments, will be described. Each line that has been projected from a light source is reflected by the surface of a target object and captured by a camera. The position of the line captured by a camera varies depending on the location where reflection took place and the position of the camera. In the case where the camera is fixed and a measuring range of the target is known in advance, it is possible to know the range of variation of each line captured by the camera. It is possible to install the cameras and light sources so that this variation range for each line does not overlap that of other lines. In this way, it is possible to uniquely specify which position of a projected pattern a line that has been observed by a camera corresponds to.

Alternatively, it is possible to resolve equivalence between shape images and light source patterns with a method that utilizes a sample of book images. With this method, a plurality of example images of shape images arising due to deformation of a book are taken in advance, after system installation. Association between the example images and light source patterns is carried out manually. At the time of observation, correlation of input shape images on similar example images is carried out, and an image with the highest degree of correlation is found. After that, at each point of an input shape image, a position where correlation for a localized region with the same point as the center is highest is found by searching in the vicinity of each point of the detected example image. Position of a pattern corresponding to the point that has been found within the example image is associated with a point of the shape image.

With the first embodiment, since the shape images and book images are acquired by time control, the times at which these images are acquired differs. By taking pictures at a sufficiently high speed with respect to speed of page deformation, it can be considered that degradation in accuracy due to variations in the acquisition times will be compensated by the following methods. Specifically, in the case where a frame rate of the camera is sufficiently high, three-dimensional point sets calculated from shape images are assigned as data for book images for successive times. On the other hand, as in the case where this assumption is difficult to establish, shapes for times when book images were obtained are estimated using one of the following methods. This method is applicable to data for each observed point.

(Method 1)

Figure 7:
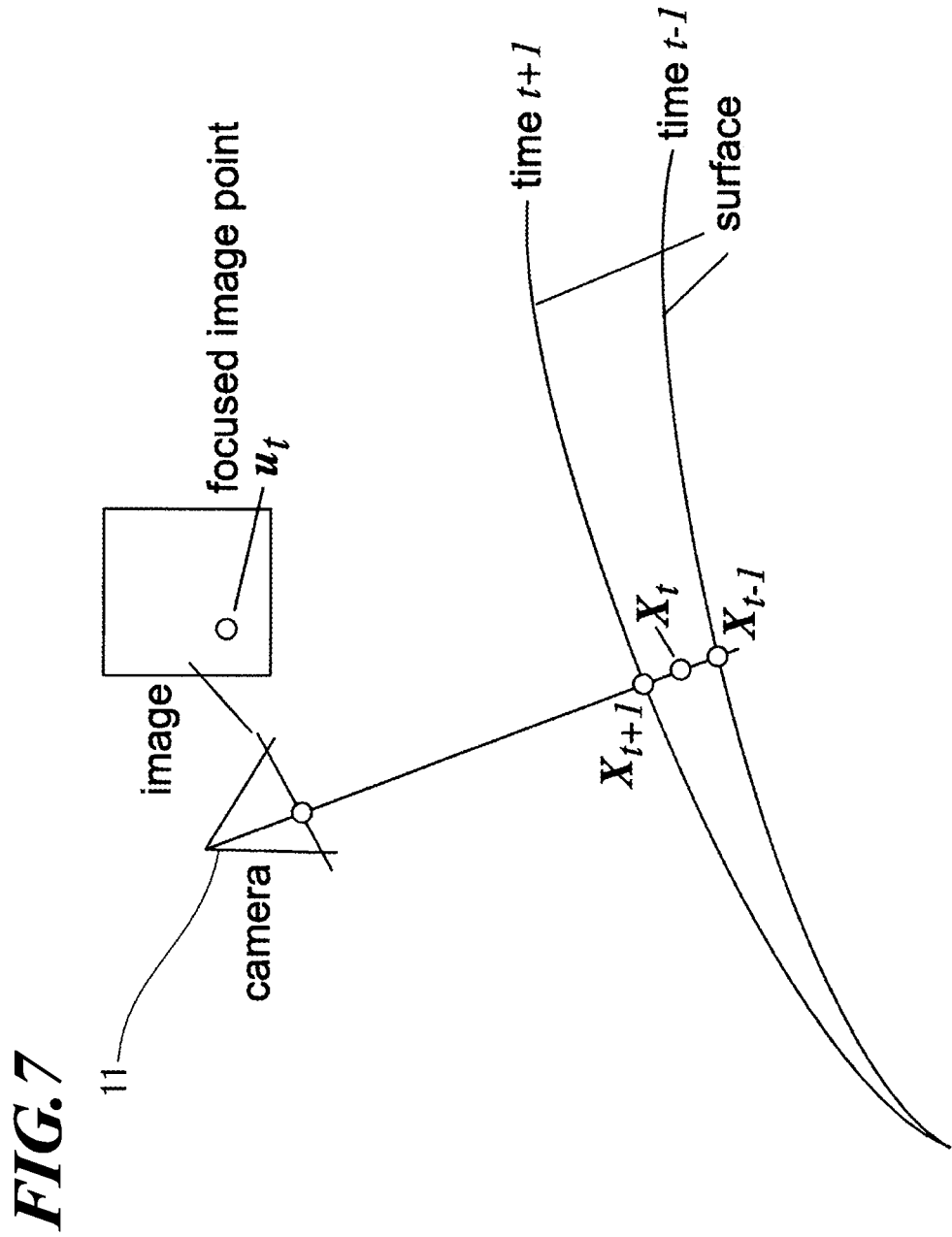
FIG. 7 is an explanatory drawing for describing estimation of page position.

The outline of this method is shown in FIG. 7. In this method, it is assumed that lens distortion of an input image has been corrected. First, crosspoints Xt−1, Xt+1 of a three-dimensional straight-line linking image points and the optical center of a camera are calculated by the perspective projection relational expression $$\omega u t = P X t$$

and curved surface shapes for calculated times t−1 and t+1 are obtained. The curved surface shapes are acquired by obtaining an approximately continuous curved surface from three-dimensional point groups calculated by the previously described method. Center values of the two points become:

$$Xt(ut)$$

The same procedure is repeated for a plurality of positions on the book image, to calculate a set of three-dimensional points for time t.

(Method 2)

Corresponding points are acquired in images taken at three consecutive times. In order to acquire corresponding points, three successive images are prepared. Here images for times t−1, t, and t+1 are prepared. The images for times t−1 and t+1 are made shape images, while the image for time t is made a book image.

First, a representative point is arbitrarily set inside the image for time t. Next, an image Is of a localized region with the same point as its center is clipped. A neighboring range having the same coordinates as the representative point as its center is set inside the image for time t−1. Within the same range the image Is is scanned, and for each point in the range image correlation between the clipped image Is and the image It−1 for time t−1 is calculated. The position on the image for time t−1 having the highest correlation is determined. The same position is made a position that corresponds to the representative point for time t. The same procedure is also carried out for the image for time t+1. A plurality of representative points are set and the same procedure is repeated to acquire a set of corresponding points. A position where a pattern is being projected should not be set as a representative point.

Next, three-dimensional positions $X_{t\pm1}$ for the acquired image points $u_{t\pm1}$ are obtained. A formula for computation is constituted by the following two equations:

$$\omega u_{t\pm1} = P X_{t\pm1}, g(X_{t\pm1}) = 0$$

Here, g(X)=0 represents the fact that a three-dimensional point X is a point on a curved surface shape.

After obtaining three-dimensional points for times t−1 and t+1, a corresponding three-dimensional point for time t is obtained. As a result, the constrained minimization problem for evalution function $\min_{X_t} |X_t - X_{t-1}|^2 + |X_t - X_{t+1}|^2$, constraint condition $\omega u_t = P X_t$ is solved.

(Step SB-2 of FIG. 3)

With this embodiment, there are a plurality of first cameras. A shape described by a coordinate system for each camera is therefore positionally aligned with a reference coordinate system using coordinate conversion obtained by calibration. Regarding the reference coordinate system, a single main camera is selected, and the coordinate system of this camera is made the reference coordinate system. In this way, shapes for all cameras at each time are shifted to the same coordinate system.

Figure 4:
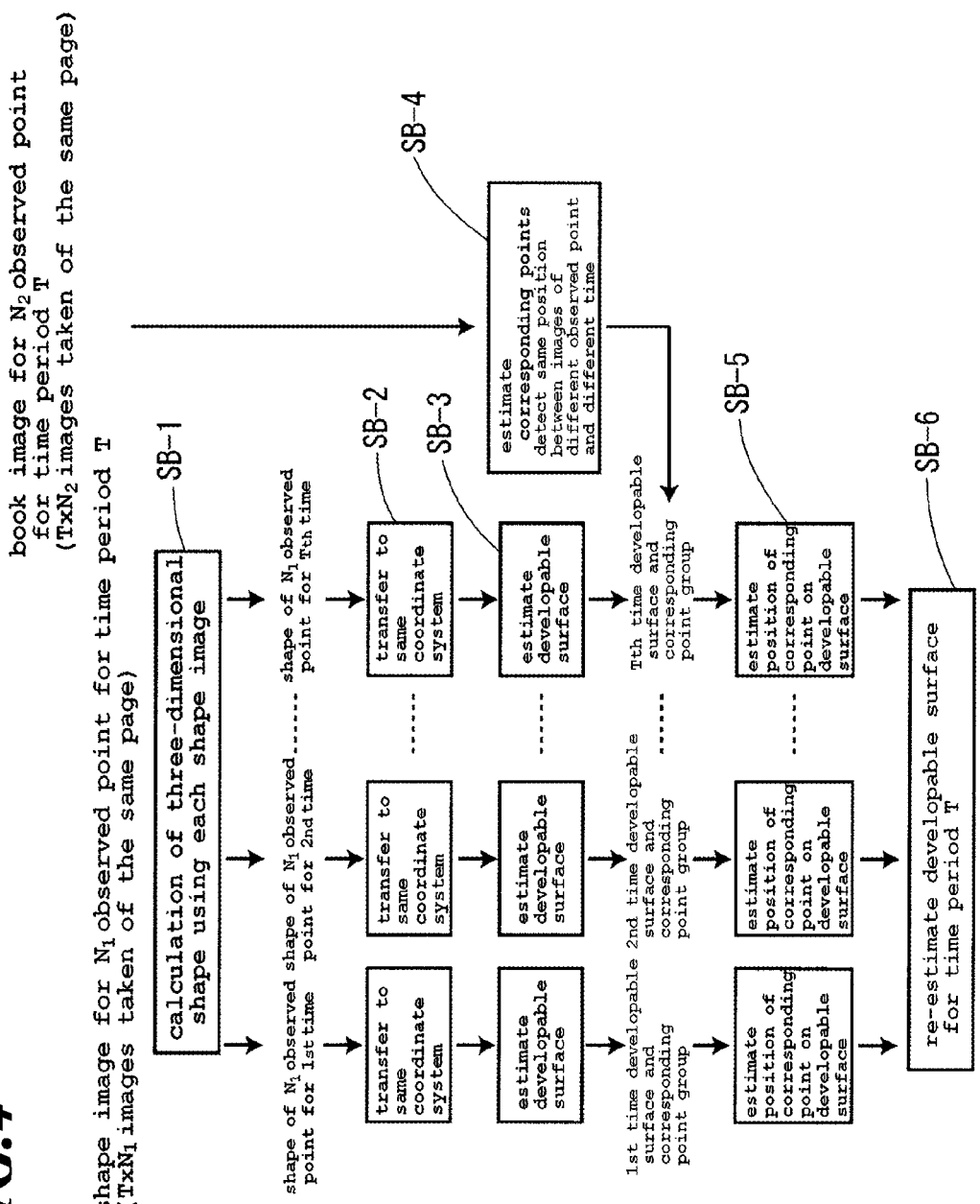
FIG. 4 is a flowchart for describing a procedure for acquiring page initial shape.

(Step SB-3 of FIG. 4)

Shape estimation for a developable surface for which there has been input of a three-dimensional point set that is aligned with the same coordinate system in step SB-2 will be described. As a developable surface model, a rectifying developable expressed by $$X(s, r) = \gamma(s) + r \cdot \xi(s)$$

$$\xi(s) = \frac{\gamma''(s) \times \gamma'''(s)}{\|\gamma''(s) \times \gamma'''(s)\|}$$

is used. With a rectifying developable, the directrix becomes a geodesic line. A specific example will be described below.

Figure 8:
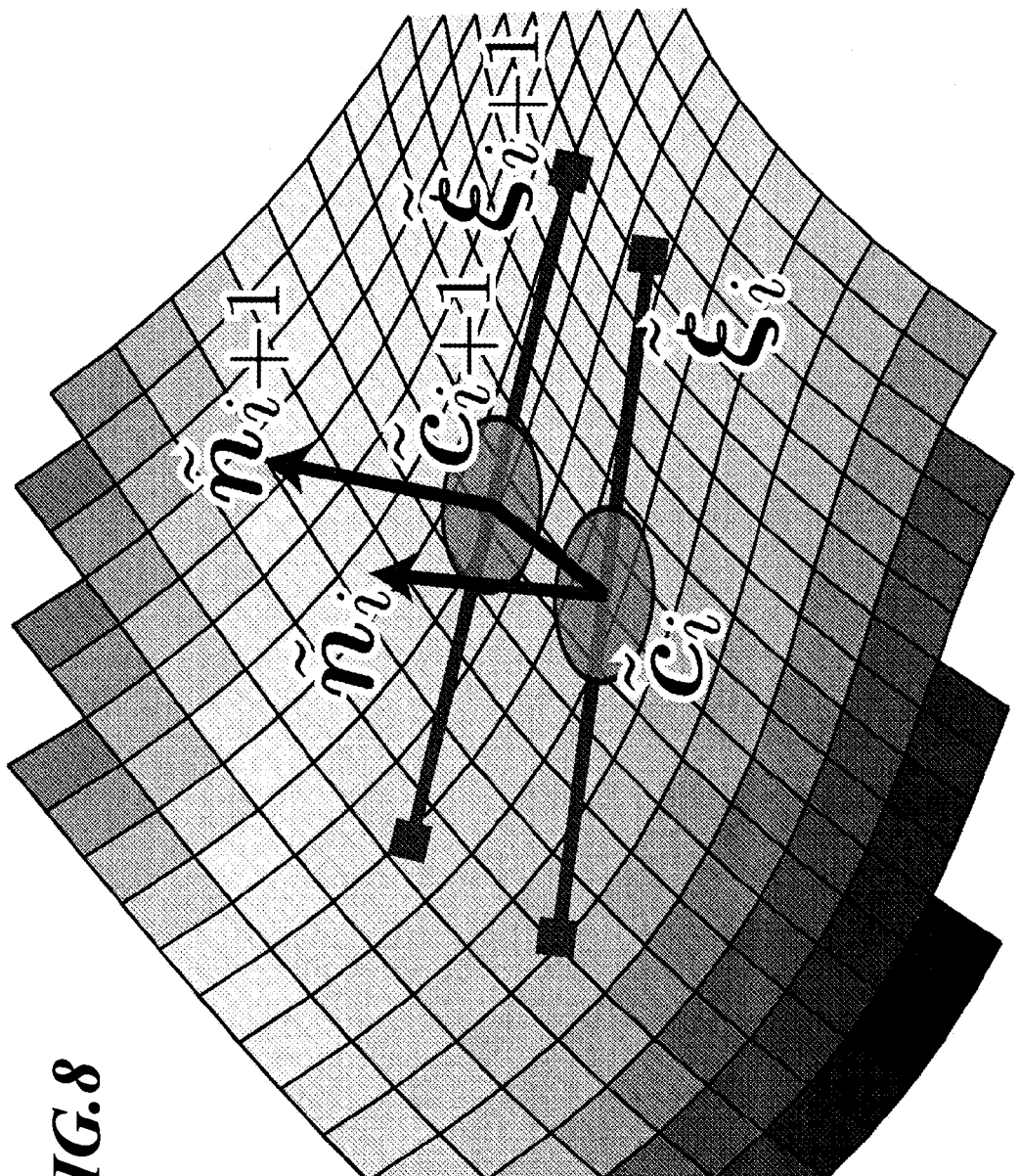
FIG. 8 is an explanatory drawing for describing estimation of a developable surface.

First, input data (a set of measured three dimensional points) is applied to a temporary parametric continuous surface. As parametric continuous curved surfaces, there are, for example, a polynomial approximation z=f(x,y) and a linear mesh, etc. After this application, a group of rulings are acquired. A method of doing this is shown in FIG. 8.

First, a method for obtaining ruling $\tilde{\xi}i$ on point $\tilde{c}i$ will be described. Ruling $\tilde{\xi}i$ passing through point $\tilde{c}i$ is orthogonal to a normal vector of point $\tilde{c}i$. Also, a group of rulings contact the curved surface. From these conditions a ruling $\tilde{\xi}i$ of point $\tilde{c}i$ is explored.

Next, a method of locating a new neighborhood point $\tilde{c}i+1$ after determination of the $i^{th}$ ruling $\tilde{\xi}i$ will be described. At this time, the directrix γ becomes a geodesic line. It is therefore necessary for a distance between two points ($\tilde{c}i$ and $\tilde{c}i+1$) to be minimal. According to this condition, it is assumed that a surrounding region of the point in question $\tilde{c}i$ is a plane, and a new point $\tilde{c}i+1$ is selected such that a vector linking the two points and the new ruling $\tilde{\xi}i+1$ are orthogonal.

With the above described method, a group of a plurality of rulings constituting candidates for a solution are obtained by changing the start point ~c0. For example, start points are arranged evenly on an xy plane (the base axes for a three-dimensional space will be called the x, y, and z axes).

Using the initial values obtained here, next the minimization problem is solved.

$$\min_{\theta,s} \sum_i |\tilde{\xi}_i - \xi(s_i)|^2 + |\tilde{c}_i - M(s_i, 0)|^2.$$

Here, θ is a model parameter of the developable surface. Also, s is a parameter for determining position of the directrix on the developable surface. Using the obtained developable surface, parameters s, r, respectively corresponding to a measured point set are obtained. The parameter s here represents curve length, but depending on the curve model that is used it is possible to use a parameter of the curve model. After determining the parameters, the following equation for the minimization problem is applied:

$$\min_{\theta} \sum_{i=1}^{N} |P_i - M(s_i, r_i)|^2.$$

In the event that estimation accuracy is insufficient, parameters corresponding to the measured points are re-calculated using a developable surface that has been estimated with the above described minimization problem, and after that the developable surface is estimated again.

The above-described step SB-3 is applied to a three-dimensional point set that has been aligned to the same coordinate system for each time, making it possible to estimate developable surfaces for a first time to a $T^{th}$ time.

(Step SB-4 in FIG. 4)

From book images numbering T×N2, a plurality of pairs of two images, in which the same range on the curved surface is being observed in the images, are generated. Positions for the same points are detected from the two extracted images and saved as corresponding points. Here, T is the number of exposures, and N2 is the number of first cameras.

A detection method for corresponding points will now be described. First, corresponding points are extracted from two images. A method of collating image feature amounts for a localized region (Scale-Invariant Feature Transform (refer to D. G. Lowe. Object recognition from local scale-invariant features. In Proceedings of the International Conference on Computer Vision, pages 1150-1157, 1999.) etc.) is used in detection of corresponding points. Also, in the case where variation between the two images is small, those having a large distance between corresponding points are eliminated. However, there are also pairs with errors in the pairs of corresponding points that are obtained here.

In order to eliminate these outliers the following procedure is applied. Using a RANSAC method (refer to Martin A. Fischler and Robert C. Bolles (June 1981). 'Random Sample Consensus: A Paradigm for Model Fitting with Applications to Image Analysis and Automated Cartography'. Comm. of the ACM 24: 381-395.) projection transforms for which degrees of collation between corresponding points of two images becomes highest are estimated. It is possible to use homography transform and two-dimensional affine transformation etc. in this projection transform. Two images are loosely aligned using this projection transform.

Next, the two loosely aligned images are subjected to patch segmentation. Patch segmentation refers to an operation to divide an image into small sections. Each section is called a patch. Patch sizes are made the same for two images.

After segmentation, the following procedure is applied to each patch. Pairs of corresponding points within patches for the same position between the two images are acquired. For the pairs of corresponding points, outliers are eliminated from pairs of corresponding points between two patches using the RANSAC method, as described above. This is repeated for all patches.

Compared to the case where a projection transform was assumed for the entire image, in the case where the transform is only assumed within a patch, that assumption is satisfied with higher accuracy by approximation, which means that detection of outliers can be considered to function effectively. After completion of the above-described procedure, a set of corresponding points acquired in each patch are used as feature points.

(Step SB-5 in FIG. 4)

Here, positions of each corresponding point on the images detected in step SB-4, on the developable surface, are obtained. This can be calculated as a problem of obtaining an intersection of a three-dimensional line linking optical axis centers of each camera and image points, and the developable surface. Next, from three-dimensional points on the calculated developable surface, coordinates of the same points when developed to a plane are obtained. This uses the method that was described in the outline of the developable surface mentioned above. Next, a reference coordinate system in the developed coordinate system is obtained, to obtain a transform to the coordinate system. As a result of the above-described procedure, a three-dimensional point X on the developable surface corresponding to point q on the image, a point u on the developable surface u, and a transform ψ for aligning with the coordinate system of a reference developable surface after development of the developable surface for each time, are obtained.

(Step SB-6 of FIG. 4)

Corresponding points between two book images that were detected in step SB-4 become at the same position on a corrected image generated by development of the developable surface. A developable surface for each of the T times is therefore re-estimated by solving the following optimization problem for corresponding points. This processing is to estimate a developable surface for each time by consolidating observation information taken a plurality of times at a plurality of camera observed points, and so is equivalent to the example of "processing to consolidate information about a plurality of book images" in the present invention.

$$\min_{\{\Theta_k\}_{k=1}^{T},\{\eta_i\}_{i=1}^{N}} Q + U_1 + U_2 \quad (1)$$

$$Q = \sum_i \|q_i - \tilde{q}_i(\Theta_{k_i}, \eta_i)\|^2 \quad (2)$$

$$U_1 = \sum_j \|\tilde{u}_{i_{j,1}}(\Theta_{k_{j,1}}, \eta_{i_{j,1}}) - \tilde{u}_{i_{j,2}}(\Theta_{k_{j,2}}, \eta_{i_{j,2}})\|^2 \quad (3)$$

$$U_2 = \sum_c \|\tilde{u}_{i_c}(\Theta_{k_c}, \eta_{i_c}) - u_{i_c}\|^2 \quad (4)$$

$$\Theta_k = \begin{bmatrix} \theta_k \\ \psi_k \end{bmatrix} \quad (5)$$

$$\eta_i = [s, r] \quad (6)$$

In these equations, $\ominus_k$ Is a parameter representing a developable surface for time k. This parameter is made up of two parameters, namely a parameter θ representing deformation of the developable surface, and a transform parameter ψ for aligning to the reference coordinate system after development, as in equation (5) above. These parameters are prepared for each time period T. Also, $\eta_i$ is a parameter representing position on the developable surface. This parameter is prepared for all points that were acquired in step SB-4. With equation (1) above, the above-described parameters are attained for all points that were acquired in step SB-4, making it possible to minimize evaluation function.

The first term in equation (1) above is shown in equation (2) above. This term calculates a difference between positions of a point on the observed image and an estimated image point corresponding to this point, so that the estimated developable surface matches the observed book image. $q_i$ represents an image point, and $\tilde{q}_i$ represents an "estimated image point" that is estimated from parameters $\ominus$ and η. This calculation is carried out by, after calculating a three-dimensional position on the developable surface from the parameters $\ominus$ and η, projecting that position onto a camera surface at a corresponding observed point. $\ominus_{ki}$ represents a developable surface parameter equivalent to the time of the $i^{th}$ image point.

The second term in equation (1) above is shown in equation (3) above. This term is calculated for pairs of corresponding points that have been detected as the same points on the page of a book in step SB-4. These points have the same position after development. In equation 3 above, a positional difference between these points on the developed coordinates is calculated. A pair of developed coordinates for the $j^{th}$ corresponding points is represented as $\tilde{u}_{i_{j,1}}$ and $\tilde{u}_{i_{j,2}}$. A number of a point equivalent to the first of the pair is represented by $i_{j,1}$, and a number of a point equivalent to the second of the pair is represented by $i_{j,2}$. The developed coordinates here are calculated using estimation parameters $\ominus$ and η. Additional characters relating to allocation of estimation parameters corresponding to each point of a pair are also described using the same rules as described above.

The third term of equation (1) above is shown in equation (4) above. This term is for calculating a point whose coordinate position after correction is known. For example, regarding angles of four corners of a page etc. coordinates after correction can be estimated if the size of the page is known. Therefore, a difference in position between a coordinate $\tilde{u}_{i_c}$ calculated using the estimation parameters $\ominus$ and η, and a known target coordinate $u_{i_c}$, is calculated with this term. $i_c$ represents the number of a point equivalent to the $c^{th}$ known point.

(Step SA-4 of FIG. 3)

Next, processing steps SA-4 and SA-5 of FIG. 3 are repeated until convergence. These processes are for creating a single corrected book image by consolidating a plurality of book images, and so are equivalent to the example "processing to consolidate information on a plurality of book images" of the present invention.

In step SA-4, a developed corrected image is restored by the corrected image restoration unit 32 of the data processing unit 3. That processing is shown in FIG. 9. Specifically, it is possible to acquire a developed corrected image (a book image that has been corrected) by solving the equation of FIG. 9 using a developable surface for each of T time periods and a book image for each of T time periods.

In the equation of FIG. 9, I(q) represents a brightness value of coordinate q. $I_k^j$ represents an image observed at a $j^{th}$ observed point for time k. $\tilde{I}(q)$ represents an estimated observation image calculated from parameter $\ominus$ and corrected image J. This calculation is represented as:

$$\tilde{I}_k(q) = \sum_{u_i, \|q - g(u_i)\| < \epsilon} B_i J(u_i) \tag{7}$$

g(u) in this equation represents a coordinate transform for the corrected image and observed image. This is a different transform depending on the shape of the developable surface. This transform function is represented as:

$$q = g(u; \ominus) \tag{8}$$

This equation is calculated from two operations to develop the developable surface and to project a point on the developable surface onto an observation camera surface. After transform of the coordinate system, a weighted total for brightness value of the corrected image positioned close to each point of the observation camera is calculated based on a lens blur model, and an estimated observation image $\tilde{I}$ is calculated.

f(J) in FIG. 9 represents a restraint condition relating to a corrected image J. In the case where information relating to J is previously known, f(J) is added.

(Step SA-5 of FIG. 3)

Next, the shape of a book image is restored by the shape restoration unit 33 of the data processing unit 3. This procedure can be accomplished by changing the problem of estimating corrected image J in step SA-4 to the problem of estimating the developable surface parameter $\ominus$. This is represented as:

$$\min_{\ominus_k} \sum_{j=1}^{N_2} \sum_q \left\| I_k^j(q) - \tilde{I}_k^j(q; \ominus_k, J) \right\|^2 \tag{9}$$

However, this minimization problem requires time in searching for a solution. In the case of executing data processing for a short time, the following restoration process is applied. This restoration procedure will be described with reference to FIG. 10.

Figure 10:
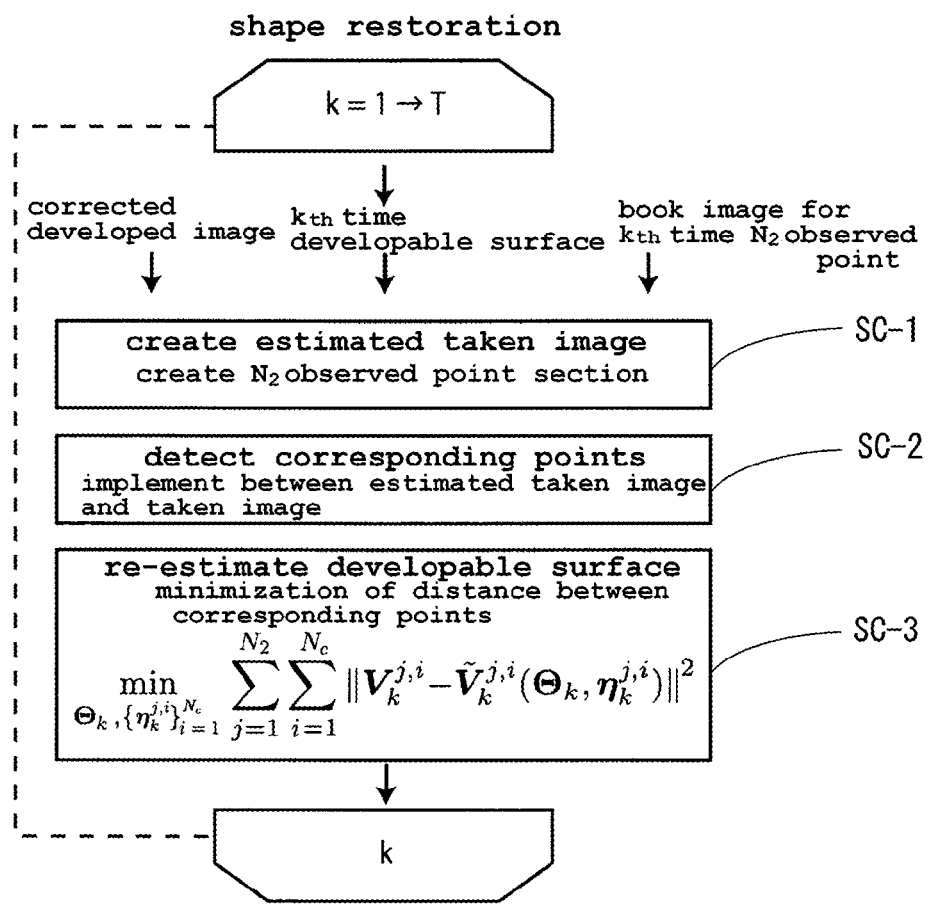
FIG. 10 is a flowchart for describing restoration of page shape.

(Step SC-1 of FIG. 10)

First, an estimated taken image $\tilde{I}k$ is created using an estimated deformation parameter $\ominus k$. The method of creating this image is the same as that described in step SA-4.

(Step SC-2 of FIG. 10)

Next, feature point correspondence between an input image Ik and a created estimated taken image $\tilde{I}k$ is acquired. Feature point correspondence uses the same method as was described with step SB-4.

(Step SC-3 of FIG. 10)

With the method of this embodiment, developable surface parameters to minimize error between positions of associated corresponding points of associated camera images are searched for and a correct developable surface is restored, without altering the corrected image.

Figure 11:
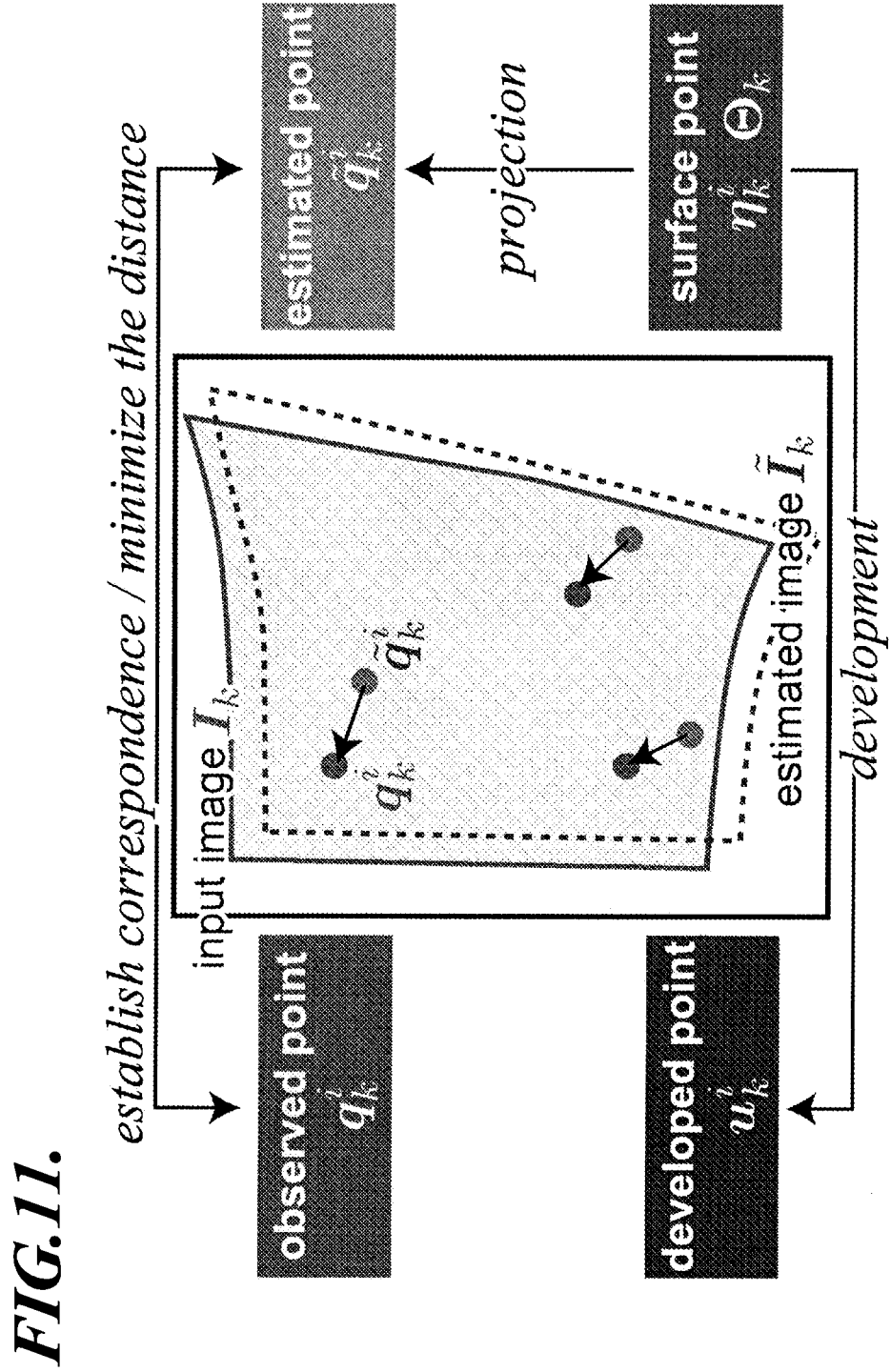
FIG. 11 is an explanatory drawing for describing a procedure for restoring a three-dimensional shape of a page.

A schematic diagram of restoration of the correct developable surface is shown in FIG. 11. The problem of minimizing error and restoring the developable surface is shown in the following equation. This problem is solved at each time.

$$\min_{\Theta_k,\{\eta_k^{j,i}\}_{i=1}^{N_c}} \sum_{j=1}^{N_2} \sum_{i=1}^{N_c} \|V_k^{j,i} - \tilde{V}_k^{j,i}(\Theta_k, \eta_k^{j,i})\|^2$$

$V_k^{j,i}$ of this equation is shown in the following equation.

$$V_k^{j,i} = \begin{bmatrix} q_k^{j,i} \\ u_k^{j,i} \end{bmatrix} \quad (10)$$

This describes coordinate q on that camera and a coordinate u on the corrected image for the $i^{th}$ notable point of the $j^{th}$ observed point of time k (the point that was acquired as a corresponding point in SC-2). A coordinate on the camera is acquired in step SC-2. After finding a corresponding point in step SC-2, a coordinate on the corrected image uses a position on the corrected image corresponding to that time point. This coordinate is a constant in the estimation of step SC-3, and does not vary. $\tilde{V}_k^{j,i}$ represents position on an observed image and position of a corrected image, calculated using the developable surface parameter $\ominus$ and the parameter $\eta_k^{j,i}$ that represents position on the developable surface. As was described also in step SB-6, among the notable points, for those whose coordinates after development are known in advance, a known value is set as a coordinate for the corrected image of $V_k^{j,i}$.

Figure 12:
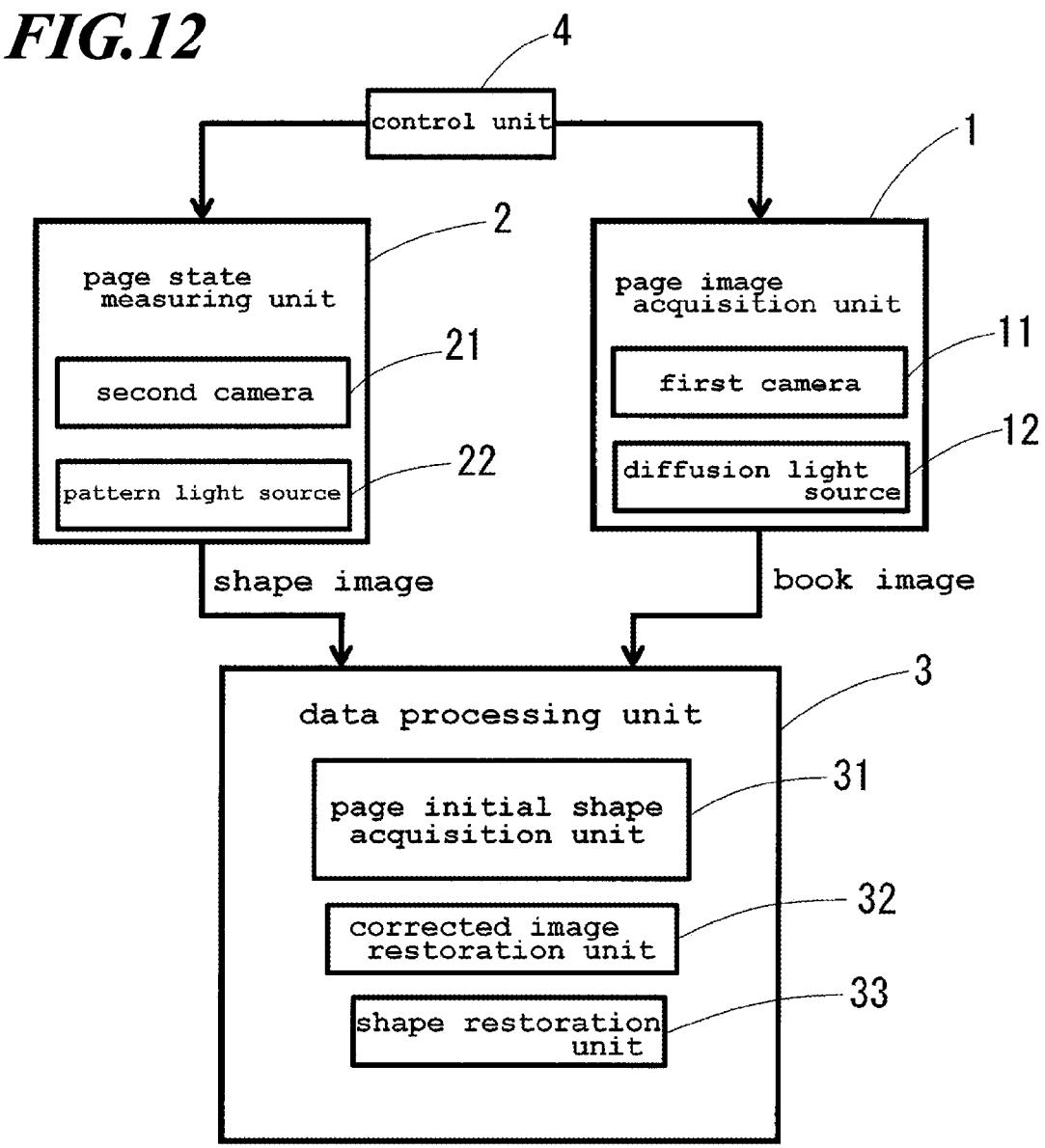
FIG. 12 is a block diagram showing the schematic structure of a book readout system of a second embodiment of the present invention.

By minimizing errors in these data, it is possible to restore a developable surface while satisfying the condition that the corrected image is unique, Second Embodiment A system according to a second embodiment of the present invention will be described in the following with reference to FIG. 12. In the description of the second embodiment, elements that are basically common to the description of the first embodiment above will use the same reference numerals in order to avoid complicating the description.

With the first embodiment described above, book images and shape images were taken together by a first camera 11. The first camera 11 of the second embodiment, however, only takes book images.

The page state measuring unit 2 of the second embodiment is provided with a second camera 21 for shape images. The second camera 21 is provided with a filter (not shown) for passing light of a wavelength that is projected from a pattern light source, and that stops other environmental light.

The pattern light source 22 of the second embodiment is configured to project a known pattern towards pages of the book using light of a known wavelength. In this way, it is made possible for the second camera to acquire a known pattern that has been projected onto the pages of the book as a shape image.

With the second embodiment the first camera 11 can acquire a book image by operating at a time when the diffusion light source 12 fires. Also, the second camera 21 can acquire a shape image, via the filter, by operating when the pattern light source 22 fires. Here, with this second embodiment, since it is possible to differentiate light from the diffusion light source 12 and light from pattern light source 22 by wavelength, it is possible to acquire book images and shape images simultaneously by firing the diffusion light source 12 and the pattern light source 22 simultaneously, and operating the first camera 11 and the second camera 21 simultaneously.

In this way, with this embodiment, there is the advantage that it is possible to increase the number of book images and shape images that can be acquired in a unit time.

Also, the first camera 11 of the book image acquisition unit 1 of the second embodiment may be provided with a filter (not shown) that stops light of the wavelength of the pattern light source 22, and passes light of wavelength from the diffusion light source 12 and the environment. With this structure, it is possible to prevent the pattern registering on the book image. However, the possibility can also be considered of preventing the pattern by image processing after page image acquisition, without providing the filter on the first camera 11 of the book image acquisition unit 1, and in this case it is possible to omit provision of the filter. With the second embodiment, since it is possible to differentiate light from the diffusion light source 12 and light from the pattern light source 22 by wavelength, it is also possible to keep both light sources on all the time.

The remaining structure and operation of the second embodiment are basically the same as those of the first embodiment described above, and so more detailed description is omitted. However, the process to resolve time variance between the shape images and the page images that was described in step SB-1 is not carried out with this embodiment The present invention is not limited to the above-described embodiments, and the addition of various modifications is possible within a range that does not deviate from the spirit of the present invention.

For example, each of the above-described structural elements do not need to exist as independent hardware as long as they exist as a functional block. A method of implementation can also use hardware, or can use computer software. It is also possible to implement a single functional element of the present invention using a group of a plurality of functional elements, and to implement a plurality of functional elements of the present invention using a single functional element.

It is also possible for each functional element constituting the present invention to exist separately. In the case where a functional element exists separately, it is possible, for example, to transfer necessary data via a network. Each function within each unit can also similarly exist separately. For example, it is also possible to implement each functional element of this embodiment, or part of a functional element, using grid computing or cloud computing.

DESCRIPTION OF THE NUMERALS

1 Page image acquisition unit
11 First camera
12 Diffusion light source
2 Page state measuring unit
21 Second camera
22 Pattern light source
3 Data processing unit
31 Page initial shape acquisition unit
32 Corrected image restoration unit
33 Shape restoration unit
4 Control unit

The invention claimed is:

1. A book readout system comprising:
a page state measuring unit configured to measure page states of a book that is in the process of being flipped through;
a book image acquisition unit comprising a plurality of first cameras, wherein the plurality of first cameras are respectively configured to acquire book images for pages of the book from mutually different directions, and wherein the plurality of first cameras are configured to acquire a plurality of book images from a start of flipping to an end of flipping for each page; and a data processing unit comprising:
- a page shape acquisition unit configured to acquire shapes of each page at a plurality of timings during the flipping of each page;
- a corrected image restoration unit configured to develop a corrected image based on a correspondence relationship between an acquired shape of the page and a book image corresponding to the acquired shape; and
- a shape restoration unit configured to restore a shape of the book image at the timing of acquisition based on a correspondence relationship between the corrected image and the book image corresponding to the corrected image.

2. The book readout system of claim 1, wherein:

the page state measuring unit comprises a pattern light source configured to project a predetermined pattern towards the pages of the book; and the plurality of first cameras are further configured to acquire shape images of pages on which the pattern is being projected.

3. The book readout system of claim 2, wherein:

the plurality of first cameras are configured to acquire the shape images at the time when the pattern is being projected from the pattern light source, and to acquire the book images at a time when the pattern is not being projected from the pattern light source.

4. The book readout system of claim 1, wherein:

the page state measuring unit comprises a second camera;

the second camera comprises a filter configured to pass light of a wavelength that is projected from the pattern light source, and to block other environmental light; and the pattern light source is configured to project a predetermined pattern towards the pages of the book using light of a predetermined wavelength so that the second camera can acquire the predetermined pattern that has been projected onto the pages of the book.

5. The book readout system of claim 1, wherein the book image acquisition unit or the page state measuring unit acquires shape images of the pages at a plurality of timings per page, and wherein the page shape acquisition unit is configured to:
- estimate a developable surface of a page based on shape images at the plurality of timings for the page;
- detect corresponding points within a book image of the page;
- estimate positions of the corresponding points on the developable surface; and
- re-estimate the developable surface at a specific timing by integrating information of the developable surface corresponding to the plurality of timings for the page.

* * * * *